United States Patent [19]

Piatek

[11] 3,948,711

[45] Apr. 6, 1976

[54] METHOD AND APPARATUS FOR MAKING DISPENSERS

[75] Inventor: Robert J. Piatek, Mount Prospect, Ill.

[73] Assignee: Kraftco Corporation, Glenview, Ill.

[22] Filed: Feb. 11, 1974

[21] Appl. No.: 441,268

[52] U.S. Cl. ............. 156/215; 53/198 R; 156/363; 156/455; 156/458; 156/475; 156/542; 156/557; 156/559; 156/567
[51] Int. Cl.² ................. B65B 11/00; B65C 3/26
[58] Field of Search ............. 222/107, 541; 229/4.5; 53/32, 198 R, 204, 209, 211; 156/69, 211, 215, 293, 449, 450, 458, 464, 468, 475, 514, 542, 557, 559, 566, 567, 187, 363, 455

[56] References Cited
UNITED STATES PATENTS

| | | | |
|---|---|---|---|
| 3,121,253 | 2/1964 | Varrial | 156/578 |
| 3,434,908 | 3/1969 | MacDonald | 156/514 |
| 3,471,351 | 10/1969 | Fuchs | 156/514 |
| 3,477,614 | 11/1969 | Runge | 222/107 |
| 3,491,511 | 1/1970 | Nigrelli et al. | 156/557 |
| 3,577,293 | 5/1971 | Ritterhoff | 156/187 |
| 3,653,176 | 4/1972 | Gess | 156/542 |
| 3,676,271 | 7/1972 | Hake et al. | 156/567 |
| 3,690,997 | 9/1972 | Bofinger et al. | 156/567 |
| 3,755,039 | 8/1973 | Terry | 156/187 |
| 3,821,046 | 6/1974 | Runge | 156/215 |
| R24,097 | 11/1955 | Von Hofe | 156/566 |

*Primary Examiner*—Douglas J. Drummond
*Assistant Examiner*—Basil J. Lewris
*Attorney, Agent, or Firm*—Fitch, Even, Tabin & Luedeka

[57] ABSTRACT

A method and apparatus are provided for feeding packages, dispensing strips, inserting nozzles in the strips, and securing the strips and nozzles on the packages, the nozzles providing for controlled dispensing of the contents of the package upon a squeezing of the package. Before the strips and nozzles are applied to the packages, a relationship is established between the strips and the packages so as to insure that the location of each nozzle is on a seam-free portion of each package wall.

10 Claims, 11 Drawing Figures

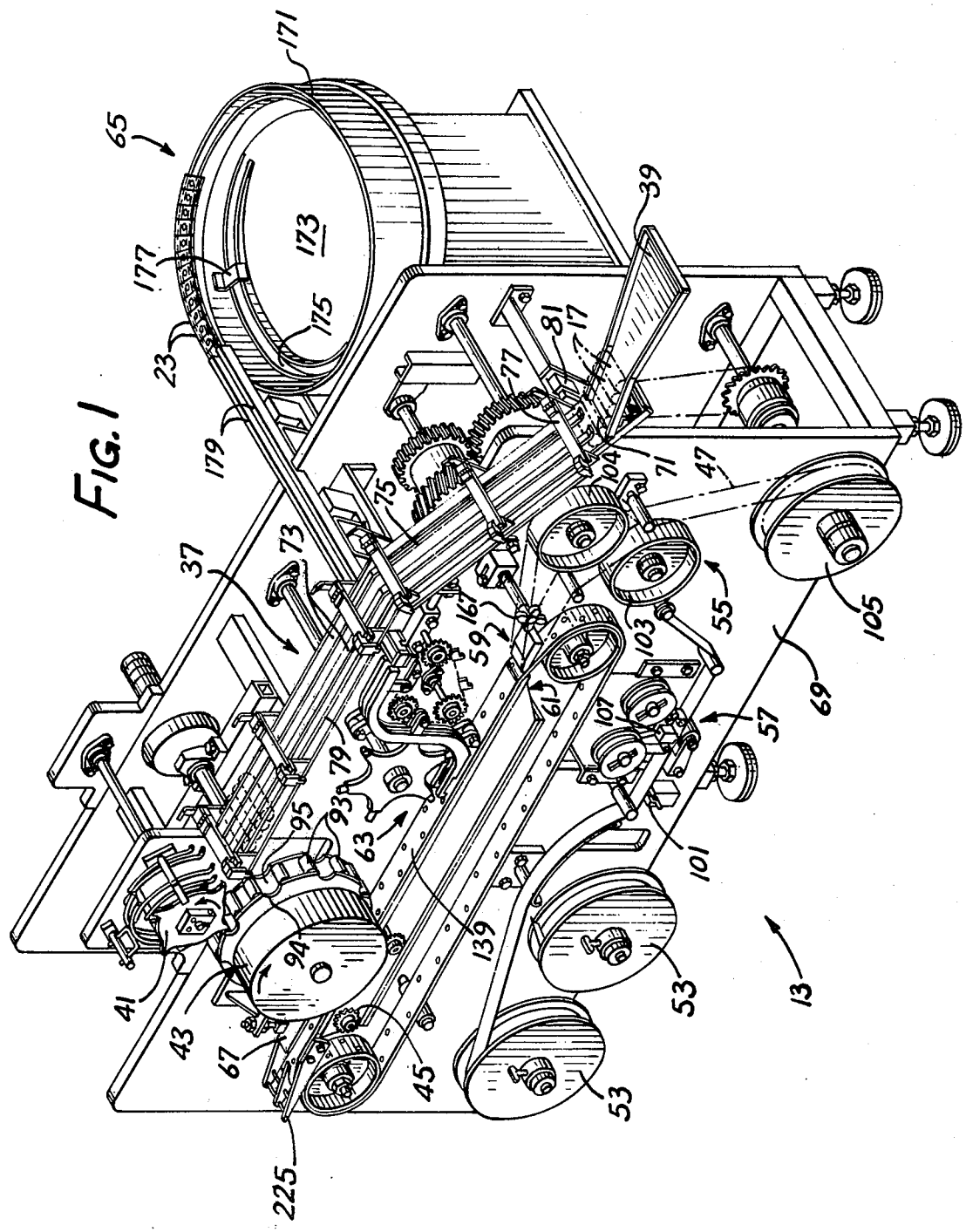

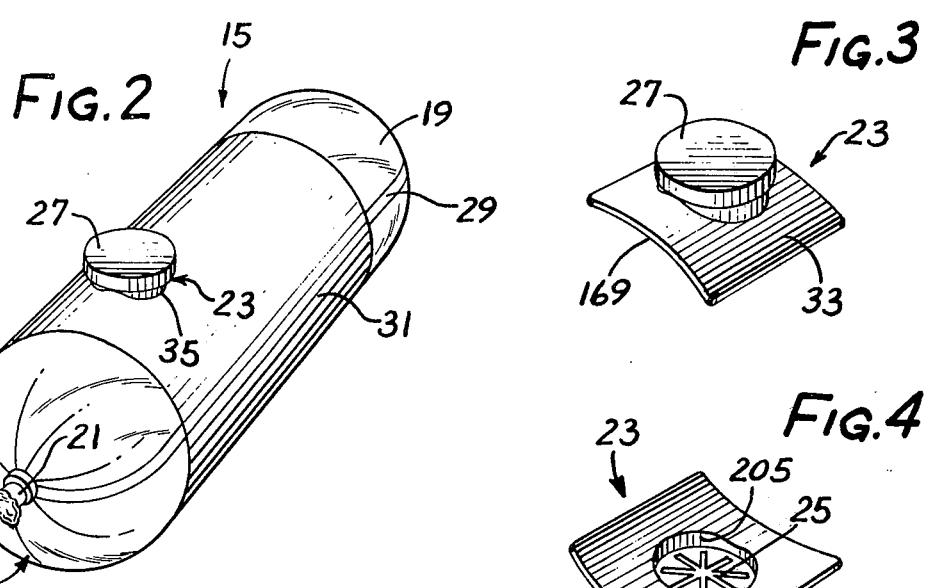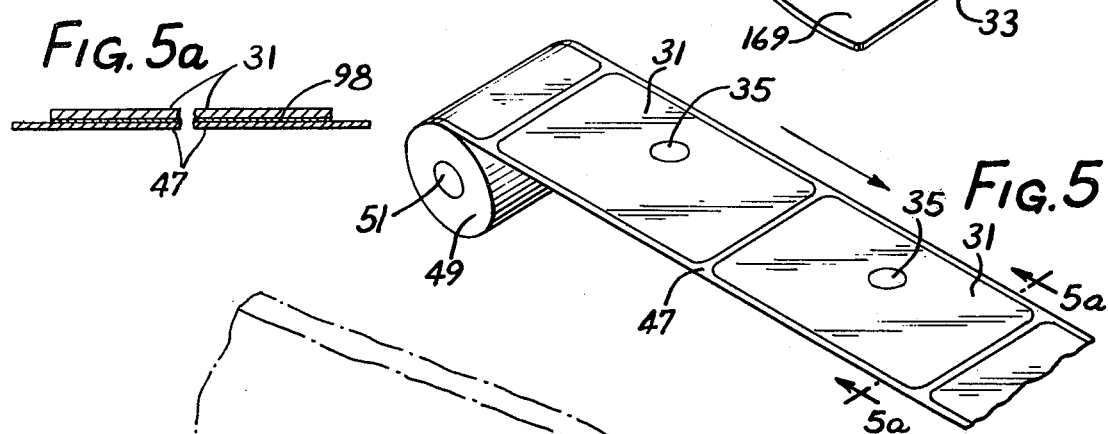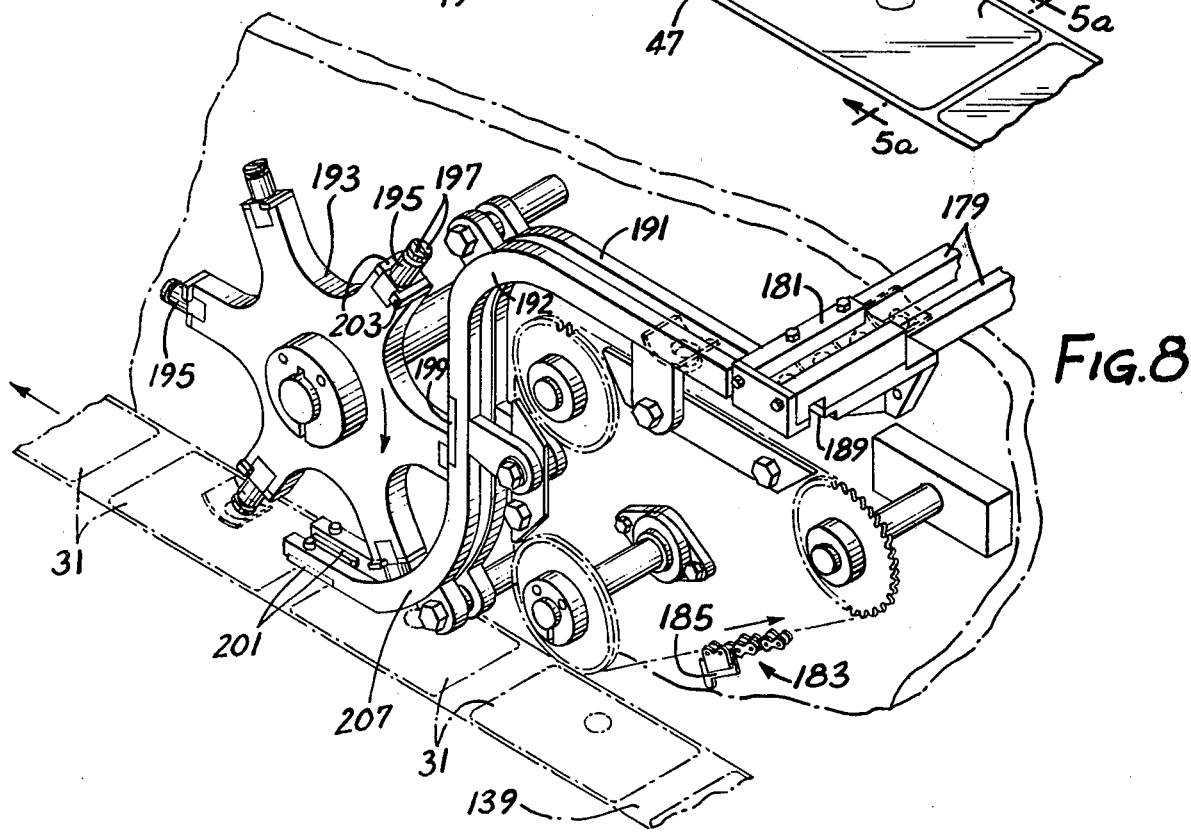

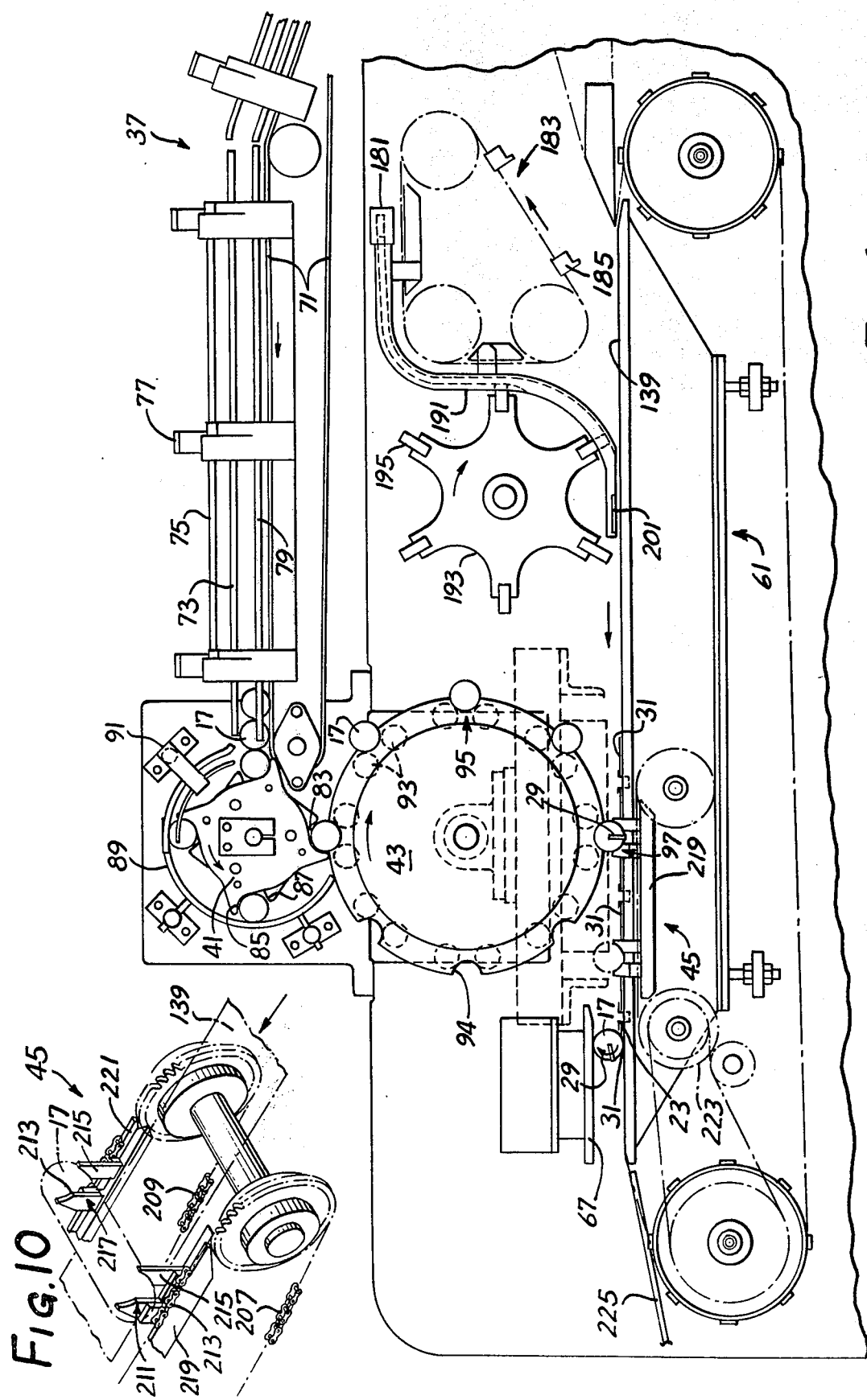

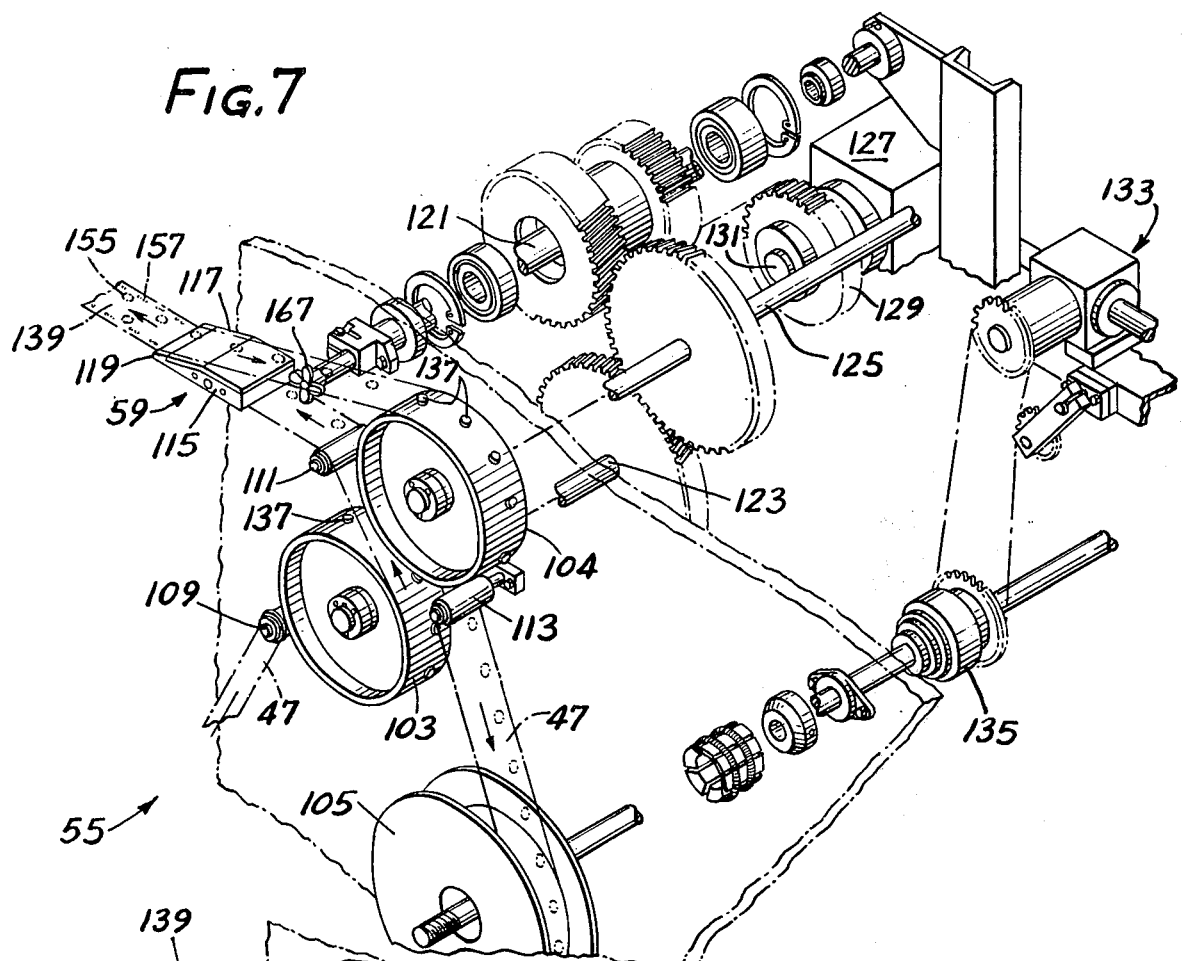

METHOD AND APPARATUS FOR MAKING DISPENSERS

The present invention relates to a method of and apparatus for forming a dispenser of the kind in which a package carries a dispensing nozzle on its exterior wall for controlled dispensing of the contents of the package upon a squeezing of the package.

The present invention is described herein in connection with, but is not limited to, the making of collapsible wall type dispensers of the kind fully disclosed in U.S. Pat. No. 3,477,614, entitled "Dispenser". The dispenser contemplated includes a completed so-called "chub" package, which is generally cylindrical in shape, having a strip or band encompassing the exterior of the cylindrical package wall. The wall is unperforated and the strip is disposed between the closed ends of the package. The strip may be a printed label, and in its encompassing relation with the wall of the package, it reinforces the wall. A dispensing nozzle is secured intermediate the strip and the imperforate package wall and extends through the strip. Generally, the "chub" package includes a seam which extends longitudinally between the closed ends of the package. The package wall is punctured through the nozzle when it is desired to dispense the contents of the package. To dispense the contents, the package is squeezed with a force sufficient to extrude the contents through the nozzle. Where the nozzle is located over a portion of the seam, the seam may rupture as a result of the wall puncture and the subsequent pressure exertion and create uncontrolled opening of the package. The label with nozzle and a package could be assembled by hand to avoid this result, but it is desirable, of course, to assemble these rapidly and efficiently.

A general object of the present invention is to provide a method and apparatus for making a dispenser of the type described wherein in a commercially and economically feasible manner a strip containing a nozzle and a package are assembled in high speed production in such a manner as to locate the nozzle on a seam-free portion of the imperforate wall of each package.

This and other objects of the invention are more particularly set forth in the following detailed description and in the accompanying drawings in which:

FIG. 1 is a perspective view of apparatus constructed in accordance with the principles of the present invention;

FIG. 2 is a perspective view of a dispensing package constructed in accordance with the preferred embodiment of the invention;

FIG. 3 is a perspective view of the top of the dispensing nozzle having a dust cap thereon;

FIG. 4 is a perspective view of the nozzle of FIG. 3 in an inverted position;

FIG. 5 is a perspective view of backing paper carrying the strips and illustrating an aperture in the strips;

FIG. 5a is a cross-sectional view enlarged for ease of illustration, of the backing paper and strip taken along the line 5a—5a of FIG. 5;

FIG. 6 is a side view in elevation of a portion of the apparatus of FIG. 1;

FIG. 7 is a fragmentary perspective view of a drive mechanism for the backing paper with parts exploded for ease of illustration;

FIG. 8 is a fragmentary view in perspective of a portion of the apparatus of FIG. 1 specifically illustrating a nozzle applying station;

FIG. 9 is a fragmentary view of a portion of the apparatus of FIG. 1 specifically illustrating a vacuum belt mechanism with parts broken away for ease of illustration; and FIG. 10 is a fragmentary view in perspective of a portion of a package transfer device of the illustrated apparatus.

As shown in the drawings for purposes of illustration and description, the invention is embodied in apparatus for and a method of forming a dispenser. The apparatus is generally illustrated in FIG. 1 and designated by the reference numeral 13. A dispenser 15 of the type herein described which dispenses its contents when squeezed with sufficient force is best seen in FIG. 2. The illustrated dispenser 15 includes a completed chub package 17, sometimes known as a cheese link, having a continuous cylindrically shaped, imperforate but collapsible wall 19 closed at opposite ends by clenched bands 21 to form the completed package to which a dispensing means in the form of a nozzle 23 having an orifice 25 (FIG. 4) is attached. The orifice 25 controls the flow of the contents of the package through the nozzle. The nozzle 23 carries a removable cap 27 which may be replaced on the nozzle between times of dispensing.

The imperforate collapsible wall 19 may be in the form of a multi-ply wall wherein the material of the plies are joined along a longitudinally extending seam 29 to form the package. An example of such a package having such a seam is that disclosed in U.S. Pat. No. 3,661,322 issued May 9, 1972 to Norman. Therein, the edges of the wall are overlapped in a manner to provide enhanced resistance at the seam 29 against splitting or tearing. Such enhanced strength characteristics of the seam are particularly important for a package on which is attached a dispensing nozzle, such as the nozzle 23, and the pressure for dispensing the contents of the package is by means of a manually exerted squeezing which applies unusual pressure at the seam 29. The illustrated package 17 may be of the type used to dispense process cheese or other extrudable materials. Such a package may be prepared for dispensing by puncturing the package wall 19 with a sharp knife point that is inserted through the orifice 25 in the nozzle 23.

Because of the aforementioned pressures exerted upon the package and the seam, it is preferable to maintain the integrity of the seam 29 and not puncture it with the sharp knife point when the knife is being used to puncture the package wall 19 through the orifice 25. Accordingly, it is preferred that the nozzle 23 be applied to a seam-free portion of the package wall 19 so that any puncturing of the package wall 19 through the nozzle 23 will not also puncture any part of the seam 29.

The present invention sets forth the method of and apparatus for applying the nozzle 23 to the package 17 in an efficient and high-speed manner while insuring that the nozzle is applied to a portion of the package wall that is free of any part of the seam 29. The strip or label 31 is wrapped around and bonded to the package wall 19. The label 31 holds the nozzle 23 securely against the outside of the package wall 19 because a flange 33 (FIG. 3) of the nozzle is positioned intermediate the label 31 and the package wall 19, as will be seen in detail hereinafter. Each label 31 is provided with an aperture 35 (FIG. 5) through which the nozzle 23 is inserted.

The apparatus which forms the dispensers 15 is best seen in FIG. 1. Very generally, the apparatus 13 includes an infeed conveyor which moves a procession of the packages 17 supplied to it by a chute 39. Each package moves in turn to a star wheel 41, thence to a seam detector and package orientor 43, and finally to a transfer conveyor 45.

As seen in FIG. 5, the labels 31 are carried on a web or backing paper 47 which has previously been wound into a roll 49 on a core 51. Returning now to FIG. 1, the roll 49 is mounted on a supply reel 53 of a label supply assembly 55. The labels are moved through a code dater assembly 57 and are then stripped from the backing paper 47 at a stripper assembly 59 and deposited on and carried by a vacuum belt assembly 61 through a nozzle feed assembly station 63 where properly oriented nozzles 23 arriving from a nozzle feeder 65 are inserted through the apertures 35 of the labels 31.

The labels are then advanced on the vacuum belt assembly 61 to a point beneath the packages 17 carried in a spaced apart relation on the transfer conveyor 45 for disposition one at a time onto the succession of labels. As will be seen in detail hereinafter, each label is caused to engage the outer surface of each package 17 and then is conformed to the shape of the wall 19 of the package by an interaction with a top plate 67. After the label with the nozzle is secured against the outer surface of the wall 19 of the package, each package in succession is discharged from the apparatus 13 for further handling.

For purposes of illustration, the preferred embodiment of the apparatus 13 is adapted to produce the dispensers 15 from a 6-ounce package 17 that is approximtely 5½ inches long and approximately 1⅝ inches in diameter. It should be understood, however, that the principles of the present invention in both method and apparatus need not be restricted to this size package, but are appliable to packages of sizes other than herein illustrated.

In accordance with the principles of the present invention, the illustrated apparatus 13 produces from about 100 to about 110 dispensers per minute in such a manner that the nozzles 23 are consistently applied to a seam-free portion of the wall 19 of each package 17.

The sub-assemblies and components of the illustrated embodiment are mounted on a stainless steel frame 69. Power for the illustrated apparatus 13 is provided by a conventional electric motor (not shown) and associated conventional drives (not shown). Since the primary power train is of the type well-known in the art, a detailed description of the power train is not provided herein.

Referring now in greater detail to the apparatus 13, a procession of packages is fed forwardly, i.e., from right to left in FIG. 1, by the infeed conveyor means 37. This infeed conveyor includes a conveyor belt 71 overhead of which is a pair of guide bars 73 supported by a guide bar frame 75 connected to hinged cross members 77. The overhead guide bars 73 in cooperation with a pair of side rails 79, one rail of which is disposed on either side of the infeed conveyor 37, maintain the product packages 17 in proper orientation. At the infeed (lower) end of the infeed coneyor 37 is the chute 39, which is inclined downwardly toward the conveyor belt 71. The chute 39 receives the product packages 17, and these packages may be placed on the chute in any suitable manner, such as by hand. The guide bar frame 75 is hinged to afford access to the packages in the event of a package jam-up. A microswitch 81 is disposed at the infeed end of the conveyor to provide a signal to shut off the machine when there are no product packages 17 at the infeed end.

The infeed coneyor 37 feeds the procession of packages 17 into the star wheel 41, which rotates in a counterclockwise direction as best seen in FIG. 6. The illustrated star wheel 41 has four pockets 83 equally spaced around the perimeter of the star wheel. Each pocket 83 is provided with a pair of lips 85 and 87. The lip 85 is an engaging lip and protrudes outwardly from the center of the wheel to a greater extent than does the lip 87, which is a retaining lip. Thus, as the star wheel 41 rotates and a pocket 83 approaches a package at the left end (as viewed in FIG. 6) of the conveyor belt 71, the protruding lip 85 engages a package 17, and as the wheel continues its counterclockwise rotation, the package 17 settles in the pocket 83 between the engaging lip 85 and the retaining lip 87. In this manner, the star wheel 41 establishes a particular spaced apart relation between successive packages 17. Overhead of the packages 17 on the star wheel and in surrounding relation to the perimeter of the wheel are guide rails 89. These guide rails are carried by suitable supports 91, which are movably mounted to provide adjustment of the guide rails. The circular guide rails 89 cause the packages 17 to remain in the pockets 83 until the pockets approach the six o'clock position of the star wheel 41. At this point, the packages 17 are deposited on the seam detector and package orientor 43.

Around the periphery of a portion of the orientor 43 directly beneath the star wheel 41 are a plurality of pairs of rollers 93, the pairs being equally spaced apart. These rollers along with indentations 94 of the orientor 43 form semi-cylindrical seats 95 which receive the packages 17 as they are individually discharged from the star wheel 41 when each package in succession arrives at the six o'clock position of the star wheel. The orientor 43 is generally below this discharge position and rotates in a clockwise directon as indicated. The movements of star wheel 41 and the orientor 43 are so timed in relation to each other that a seat 95 of the orientor meets each pocket 83 as each pocket arrives at the six o'clock position of the star wheel 41. Accordingly, each package 17 is timely transferred from the star wheel 41 to the seam detector and package orientor 43.

The semi-cylindrical shape of the seat 95 conforms generally to that of the package 17 both in shape and dimension. Hence, there is a snug fit between each package 17 and a seat 95.

A vacuum system (not shown) within the orientor 43 is utilized to create a pressure differential sufficient to retain each package 17 in its seat 95. Such a system is used rather than the overhead guides of some other parts of the apparatus to permit free rotation of the package 17 about its longitudinal axis. The rollers 93 are rotatably mounted, and they cooperate in their direction of rotation so as to cause an axial rotation of the package 17 as it is retained in the seat by the pressure differential. Up to this point the packages have been moved by the infeed conveyor 37 and the star wheel 41 without regard to the position of the seam 29. Consequently, the seams 29 are randomly positioned as the packages are transferred from the star wheel 41 to the orientor 43. Stated otherwise, there is no uniform position of the seam 29 with respect to the axis of rotation of each package of a succession of packages 17.

To insure ultimately that each nozzle 23 is located on a seam-free wall portion of each package 17, it is important that the packages be uniformly oriented before the label 31 with a nozzle is applied to each package. To be in consonance with the high speed output of the present apparatus and the overall economics of production, it is preferred that this uniform orientation be done automatically. Accordingly, the rollers 93 rotate the package 17 until a sensing means (not shown) between each pair of rollers 93 senses the extra thickness of the package wall 19 at the seam 29. This detection occurs at a point where the seam is essentially positioned toward the center of the orientor 43, i.e., the center bottom of each seat 95 and each pair of rollers 93. When each seam reaches this point, the sensing means provides a signal that sets in motion a controlled stopping of the rotation of the rollers 93 at a point where the seam is located 180° from the point of detection. This occurs during rotation of the orientor 43 between the point of package pickup (the twelve o'-clock position of the orientor 43) and the point of package discharge (the six o'clock position of the orientor 43). Thus, each package 17 is rotated about its axis until its seam 29 is essentially located facing outwardly from the center of rotation of the orientor 43 by the time the package arrives at the six o'clock position of the orientor. Hence, all packages 17 are automatically uniformly oriented in spite of their random orientation at infeed.

At the six o'clock position of the orientor 43, the vacuum is shut off and the package 17 is released. It then moves by gravity onto a cradle 97 so timed to be located below the package at the moment of release.

The cradle 97 is a part of the transfer conveyor 45 which effects the transfer of each seam-oriented package 17 from the orientor 43 to the vacuum belt assembly 61. As can be seen in FIG. 6, just prior to its discharge from the orientor 43, the package 17 is in a position where its seam 29 is on the side of the package facing the vacuum belt assembly 61. The cradles 97 and the transfer conveyor 45 carry the uniformly seam-oriented packages 17 in unison with the movement of and intermediate successive labels 31 carried on the vacuum belt assembly 61 below the orientor 43. As will be seen in detail hereinafter, the cradles 97 serve to align the packages with the space occurring between successive labels 31 and space apart the packages to coincide with these spaces. The labels 31 are received by and carried on the vacuum belt assembly 61 in a manner also hereinafter described in detail.

A detailed description of the operation of the seam detector and package orientor assembly 43 is not included herein inasmuch as this assembly is a commercially available unit. For example, such a unit heretofore has been available from Mark Products, Inc., Houston, Texas.

The labels 31 are delivered to the vacuum conveyor assembly 61 in a manner best seen by reference again to FIG. 1. As previously described, the labels are fed on the present apparatus 13 from the supply reels 53, and the supply reels carry the rolls 49 (FIG. 5) of web or backing paper 47 having the labels 31 applied thereon. The labels are provided on their back side with a suitable pressure sensitive adhesive 98 (FIG. 5a). The labels are disposed along the supporting material or backing paper 47. This backing paper 47 is in the form of release paper, and, as will be described hereinafter, releases the labels at the appropriate station. The pressure sensitive adhesive 98 on the back side of the labels 31 is retained on the labels when the label subsequently is stripped from the backing paper. This adhesive 98 subsequently is utilized as the bonding agent between the label and the package 17, as detailed hereinafter.

As used in the illustrated embodiment, the labels are 5¾ inches long, 3 3/16 inches wide, and are closely spaced in alignment on the backing paper 47 with approximately 9/64 of an inch space between labels. The backing paper is approximately 3 5/16 inches wide, thus providing a 1/16 inch marginal edge on each side of the label. The labels are pre-printed with suitable indicia and are pre-punched to provide the apertures 35, which receive the dispensing nozzle and dust cap assemblies in a manner hereinafter described. The backing paper 47 is also pre-punched with apertures (not shown) corresponding to those of the labels and are located so as to coincide with the apertures of the labels when the labels are disposed on the backing paper as indicated. Thus combined, the aligned apertures become feed holes for the feeding of the backing paper through the label supply assembly 55.

It will be noted that the label supply assembly 55 includes a pair of the supply reels 53. Labels are then drawn from either of the supply reels at a given time with the other serving as a stand-by. The backing paper is pulled through the code dater assembly 57, which includes a limit switch 101, by a pair of drive rolls 103 and 104. Intermediate and forward of the drive rolls is the stripper assembly 59. Below the drive rolls 103 and 104 is a rewind reel 105.

The code dater assembly 57 imprints coded information, such as a date code, on the outside surface of each label as it passes through the assembly. This code dater assembly may be any suitable rotary ribbon type imprinting mechanism. For example, one such mechanism heretofore available has been manufactured by Norwood Marking and Equipment Company, Inc., of LaGrange, Illinois, and known as Norwood Model No. B-3. A type head 107 of the code dater assembly 57 is mounted so as to move in an orbital path and cause printing on the label material during the movement of the label through the assembly. The limit switch 101 may be of any suitable type, and in the illustrated embodiment is a normally open switch that is held closed by the tension of the backing paper 47. Thus, if tension is lost because of a tear in the backing paper or because of supply roll depletion, the limit switch 101 opens and sends a signal that causes the apparatus 13 to stop operating.

A portion of the drive system for the label supply assembly 55 is illustrated in FIG. 7. The backing paper is fed upward around a roller 109 (lower left of FIG. 7), under and around the drive roll 103, over a roller 111 to the stripper assembly 59, back over and around the drive roll 104, inside a roller 113 and finally to the rewind reel 105.

The stripper assembly 59 in the illustrated embodiment includes a stainless steel, beveled frame 115, a cover 117, and a heater (not shown). The amount of heat transferred to the frame and cover by the heater is controlled by a suitable adjustable thermostat (not shown) in a manner well known in the art. The labels 31 and the backing paper 47 move in sliding contact with the underside of the heated frame 115. Heat is transferred to the backing paper during this contact and facilitates the release of the labels from the backing paper. The labels are on the underside of the backing paper at the time of this heat transfer, and when the backing paper subsequently makes a sharp angular bend around the beveled frame 115 at the nose 119, the warm labels fail to conform to the sharp bend of the paper. Thus, the labels with their adhesive backing papers 98 separate from the release type backing paper and continue in their plane of movement and are deposited on the vacuum belt assembly 61 as described hereinafter. The backing paper then continues without the labels in a path over the drive roll 104 and onto the rewind reel 105.

Generally, the power train of the label supply assembly 55 includes three shafts, namely 121, 123, and 125, that carry an assortment of gears (shown generally) to transmit rotational motion to the drive rolls 103 and 104. An indexing mechanism 127 provides the rotational force for this power train through a spur gear 129 mounted on a shaft 131 extending from the indexing mechanism 127. The function of the mechanism 127 is important in the operation of the apparatus 13, as will be detailed hereinafter.

The rewind reel 105 is driven by a drive system 133 that includes a slip clutch 135. Slip clutches are well known in the art, and the slip clutch 135 may be any suitable known type. Continuous rotative motion is supplied by the system 133 and is transferred to the reel 105 through the slip clutch 135 to keep tension on the backing paper 47 as it passes under the roller 113. Thus, as the backing paper 47 leaves the drive roll 104, it is taken up on the rewind reel 105.

The positive drive for the backing paper 47 is obtained from a combination of a rubber coating (not shown) on the perimetral surfaces of the drive rolls 103 and 104 and spaced apart lugs 137 on these rolls. The lugs 137 are spaced apart and otherwise disposed on the drive rolls 103 and 104 to correspond to and align with the apertures 35 in the labels and backing paper. The lugs are long enough to extend through the apertures 35.

Thus, rotative drive force is provided by the indexing mechanism 127, transferred to the power transmission shafts 121, 123 and 125 and the drive rolls 103 and 104, and the rotative force is translated into a longitudinal movement of the backing paper 47.

As described previously, the labels 31 are successively released from the backing paper 47 as the backing paper takes the sharp bend around the nose 119 after the backing paper has absorbed some of the heat from its sliding contact with the underside of the stripper assembly 59. After separation from the backing paper, the labels tend to continue their forward direction in the same general plane of movement (to the left in FIGS. 1 and 7). The labels are then deposited on the vacuum belt assembly 61, and more specifically, on a vacuum belt 139 of the assembly 61. The vacuum belt 139 moves away from the stripper assembly 59 in the direction indicated. The vacuum belt 139 carries the labels 31 from the stripper assembly 59 to the nozzle feed assembly or applying station 63 and then to the seam detector and package orientor 43 (FIG. 1).

The vacuum belt assembly 61 is best seen in FIG. 9 and includes a vacuum chamber 143, which is located within the continuous loop of the belt 139. The vacuum chamber 143 may be of stainless steel construction and is provided with three grooves along its top surface. A wide groove 145 is flanked by lesser grooves 147 and 149. The wide groove 145 is offset from center and provides clearance for the nozzles 23 and dust caps 27, as will be hereinafter seen in detail. The grooves 147 and 149 are vacuum grooves. Holes 151 are provided in the grooves 147 and 149 for communication between the grooves and the vacuum chamber 143. The vacuum chamber 143 is in turn in communication with a vacuum source (not shown) through a conduit 153.

The belt 139 moves at a constant speed and is perforated with holes of two sizes. Holes 155 are the larger of the two sizes and are used for driving, timing, belt alignment, and clearance for the nozzles 23, as will be seen more clearly hereinafter. Holes 157 are the smaller holes and are located in the belt in two spaced apart, longitudinal rows so as to ride above the grooves 145 and 149 and provide communication of the vacuum to the upper side of the belt for holding down the labels on the belt. The holes 155 are individually located in an equally spaced apart but staggered relationship forming two other longitudinal rows intermediate the rows of vacuum holes 157.

At the left end of the belt loop, as viewed in FIG. 9, is a drive roll 161, and at the right end is a take-up roll 163. Both rolls engage the vacuum belt 139 by means of equally spaced apart and staggered lugs 165 projecting from the perimetral surface of the rolls 161 and 163. The positioning of these lugs corresponds to the positioning of the large holes 155 in the vacuum belt 139, allowing the lugs to positively engage and position the belt. The uppermost row of holes 155 as viewed in FIG. 9 is located to move longitudinally over the wide groove 145. The other row moves over a land intermediate the grooves 145 and 149.

As mentioned previously, the vacuum belt 139 moves at a constant speed. Since it is positively engaged and driven, it serves also as a timing belt, and other assemblies in the illustrated apparatus associated with the vacuum belt assembly 61 utilize this belt as a reference against which they are adjusted for registration, as will be seen hereinafter.

In the foregoing description of the transfer conveyor 45, it was seen that each cradle 97 receives a seam oriented package 17 and carries the package for a time in between adjacent labels 31 on the vacuum belt 139 in unison movement with the vacuum belt. The package is then deposited in that position on the belt. It will be recalled in connection with the label supply assembly 55 (FIGS. 1 and 7) that the labels 31 are carried on the backing paper 47 in a closely spaced succession (FIG. 5). In fact, the spacing intermediate successive labels 31 is approximately 9/64 of an inch, and this space is much too small to permit the above-mentioned deposition of a package 17 between successive labels. Hence, provision is made in the illustrated apparatus to expand the distance between successive labels before the labels are delivered to the vicinity of the transfer conveyor 45. A primary reason for the initial closely spaced succession of labels is the conservation of space on the backing paper. Once the labels are separated from the backing paper, however, the purpose served by the close spacing has been fulfilled. In the following paragraphs, it will be seen how this spacing is expanded to a distance of approximately one inch on the vacuum belt 139.

Referring once again to FIG. 7, it will be recalled that the drive rolls 103 and 104 of the label supply assembly 55 receive their rotative motion from the indexing mechanism 127 through an intermediate train of parts.

This indexing mechanism 127 is adapted to alternately advance and retard the speed of the backing paper in repeating cycles and to retain a constant speed for a portion of each cycle at the advanced speed. Each such cycle coincides with the release of a label 31 from the backing paper 47 at the stripper assembly 59.

At the time each label 31 is delivered to the point of release at the nose 119 of the stripper assembly 59 (FIG. 7), the speed of movement of the backing paper 47 essentially equals for a time the speed of the vacuum belt 139. Hence, when the label 31 is transferred from the backing paper to the vacuum belt as hereinbefore described, the label and the vacuum belt are moving substantially at the same speed and in the same direction so that there is little relative movement between the two at transfer. The label then continues to move on the belt toward the nozzle feed assembly station 63 at the constant speed of the belt, but the backing paper moves toward the rewind reel 105 at a varying rate of speed.

Immediately after the transfer of the label 31, the indexing mechanism 127 retards the speed of the backing paper to effect increased distance between successive labels on the vacuum belt 139, and the indexing mechanism 127 is adapted to cause this distance to be approximately 1 inch in the illustrated embodiment. The retard is immediately followed by an advance to the original speed (substantially equal to that of the vacuum belt), and this speed is maintained constant for approximately 30° of the 360° operating cycle to facilitate label transfer. Thus, in each complete cycle, the backing paper moves at the same speed as the vacuum belt for approximately 1/12 of the cycle to transfer a label, and then retards speed and advances again to the original speed during the balance of the cycle to allow the transferred label to move away before the succeeding label is transferred. A cam (not shown) in the indexing mechanism 127 controls these movements in each cycle. Such a cam may be of a type well known in the art and within the capability of one skilled in the art to produce, and indexing mechanisms having such cams have been commercially available. For example, such an indexing mechanism heretofore has been available from Commercial Cam and Machine Co., Chicago, Illinois.

Returning now to FIG. 7, a manual adjustment knob 167, which extends from the main drive shaft 121, is provided to afford altering the general relationship between the backing paper 47 and the conveyor belt 139 and thereby establish registration or coordination between the two so that the apertures 35 in the labels (FIG. 5) will coincide with the corresponding large holes 155 in the vacuum belt after the labels are transferred.

As mentioned previously, the nozzles 23 are applied to the labels 31 on the vacuum belt assembly 61 at the nozzle feed assembly station 63. More specifically, as best seen in FIG. 1 the nozzles are initially supplied from the nozzle feeder 65. The nozzle feeder provides a procession of the nozzles 23 wherein the nozzles are oriented in a particular manner. In FIG. 3, it will be seen that each nozzle is provided with a flange 33, and this flange is in the form of a concave surface 169. The shape of this concave surface 169 substantially conforms to the outer surface or wall 19 of the package 17. These nozzles are initially aligned such that the concave surface is facing upwardly. Thus the caps 27 on the nozzles face downwardly and are eventually inserted through the aperture 35 in the label 31.

The illustrated nozzle feeder 65 is a vibratory type feeder and includes a vibratory hopper 171 having an open top into which a quantity of non-oriented nozzles 23 already preassembled with dust caps 27 are deposited. The hopper has a bottom wall 173 beneath which is a conventional vibrator (not shown) for imparting motion to the nozzle assemblies. The nozzles travel radially outwardly toward and into an upwardly spiralling track 175 in response to the vibrations. A deflector 177 overhanging the track causes any nozzle assembly not properly oriented with the cap down in the track 175 and the concave surface up to return to the bottom wall 173.

The track 175 directs a procession of properly oriented nozzles 23 into a pair of spaced apart rails 179. In the preferred embodiment, these rails also have a conventional vibrator (not shown) attached to them to keep the nozzles moving toward the nozzle feed assembly station 63. The rails 179 direct the nozzles under the infeed conveyor 37, and, as best seen in FIG. 8, into a transfer block 181. Below the outer end of the transfer block is a lug chain 183 carrying a plurality of lugs 185. A projection 187 on each lug 185 moves into a channel 189 in the lower face of the transfer block 181. The channel lies transversely of the procession of nozzles 23 entering the block from the rails 179.

A lug 185 moving on the chain 183 in the channel 189 engages an awaiting lead nozzle 23 positioned adjacent the end of the rails 179 and causes a transfer of the lead nozzle into a guide track 191 disposed generally at 90° to the line of nozzles. The guide track bends at 192 and then extends downwardly to receive outer portions of a rotating star wheel 193. The star wheel in the preferred embodiment has six points, and at the ends of each point is a spring-loaded, expandable finger 195. The finger is split longitudinally into two semi-cylindrical members 197 that are urged apart by an internally disposed compression spring (not shown).

A pair of opposing cams 199 are located in the walls of the guide track 191 near the point where the fingers 195 on the rotating star wheel 193 are inserted within the confines of the guide track 191, and another pair of opposing cams 201 are located in the walls of the guide track near a downstream point where the fingers leave the confines of the track 191. The two pair of opposing cams 199 and 201 are essentially alike, and, as may be seen in the illustration of the pair 201, project toward each other and inwardly of the walls of the guide track 191.

From each expandable finger 195 a pair of opposed cam followers 203 extend outwardly and transversely of the finger, one cam follower from each semi-cylindrical member 197. These cam followers 203 engage the cams 199 and 201 successively. Each pair of cams squeeze the cam followers 203 and thus the semi-cylindrical members 197, toward each other against the urging of the aforementioned compression spring (not shown) as the followers engage the surfaces of the respective cams. Intermediate the cams 199 and 201, the finger expands in response to the urging of the spring.

The lugs 185 on the chain 183 are spaced apart and timed in relation to the rotation of the star wheel 193 so that a nozzle 23 with its concave surface 169 facing the star wheel is caused to be in position to receive a squeezed together finger 195 moving intermediate the cams 199. Consequently, the free ends of the two semi-cylindrical members 197 are inserted within a cylindrical wall 205 portion of the nozzle 23, (FIG. 4), and after passing intermediate the cams 199, the fingers then expand as described above to grip the interior of the wall 205 and carry the nozzle through a forward bend 206 in the guide track 191. The nozzle is then directed toward a label 31 carried beneath the track 191 on the vacuum belt 139. A label is timely positioned on the belt to receive the projection of the nozzle 31 having the cap 27 assembled thereon in the aperture 35. It will be recalled that a groove 145 is provided in the top wall of the vacuum chamber 143 of the vacuum belt assembly 61 (FIG. 9) to receive the portion of the nozzle 23 that is inserted through the aperture 35 of the label 31. Thus, the finger 195 moves the nozzle 23 through the forward bend 206 and into inserted relation with the arriving label 31 before the second pair of opposing cams 201 in the guide track 191 squeeze the cam followers 203 and the semi-cylindrical members 197 toward each other to release the nozzle 23. Following its release, the nozzle 23 is then carried forward (downstream) from the rotating star wheel 193 by the label 31 on the vacuum belt assembly 139.

A conventional drive system (not shown) common to the heretofore described interacting assemblies of the apparatus 13 (FIG. 1) maintains a fixed timed relation among such assemblies in particular as the lug chain 183, the nozzle star wheel 193, the vacuum belt assembly 61, the package star wheel 41, the seam detector and package orientor 43, and the transfer conveyor 45 to timely effect the corresponding operational steps. The earlier mentioned manual adjustment knob 167 (FIG. 7) is utilized to initially establish coordination in the transfer of the labels 31 from the label supply assembly 55 to the vacuum belt assembly 61.

Summarizing the description to this point, in a first path of travel, as best seen in FIGS. 1 and 6, a procession of packages 17 move on the infeed conveyor 37 and are picked up individually by the package star wheel 41. The star wheel 41 presents the packages individually to a seat 95 on the seam detector and package orientor 43 located at the twelve o'clock position of the orientor rotation. The packages are then carried from the twelve o'clock position to the six o'clock position of the rotating orientor, and during this time a pair of rollers 93 rotate each package in the seat 95 until the seam 29 of the package is detected and then positioned at a point facing outwardly of the orientor periphery. Thus by the time all the packages 17 arrive at the six o'clock position of the orientor, their seams are uniformly positioned, the seam then being located so as to face downwardly and toward the vacuum belt assembly 61 therebelow. Longitudinally spced apart cradles 97 on the transfer conveyor 45 timely arrive just below the six o'clock position of the orientor to receive the uniformly oriented packages individually.

In a second path of travel, a procession of nozzles 23 having caps 27 assembled thereon and oriented so that the caps are directed downwardly are carried by a pair of rails 179 and moved by vibratory means to a transfer block 181. Here the nozzles are individually transferred to the guide track 191 where they are each internally engaged by expandable fingers 195 extending outwardly from points on the rotating star wheel 193. The nozzles are then delivered to the nozzle feed assembly station 63 for transfer in inserted relation to the labels 31 on the vacuum belt 139.

In a third path of travel, the label supply assembly 55 provides labels carried on the backing paper 47, and at the stripper assembly 59, the labels are transferred from the backing paper to the vacuum belt 139 moving on the vacuum belt assembly 61. At the time of transfer, the backing paper and vacuum belt are moving at the same rate of speed, but the backing paper is caused to move in a cycle that includes retarded speed after the transfer of the label followed by an advance to the speed of movement of the vacuum belt prior to the transfer of the immediate succeeding label. During the retarded speed of the backing paper, the vacuum belt moves each transferred label away from the stripper assembly 59 at the maintained constant speed of the vacuum belt, and this action serves to increase the distance separating successive labels on the vacuum belt over that of the labels on the backing paper. The labels in their increased spacing move downstream on the vacuum belt to the nozzle feed assembly station 63. At this station the second path in which the oriented nozzle and cap assemblies move and the third path in which the labels move are in proximity of one another with a portion of the second path being oriented such that it and a near portion of the third path lie in a common plane and coincide at one point. At the point of coincidence of the paths of travel, a nozzle 23 is inserted with the cap 27 directed downwardly into the aperture 35 of each label 31. The label and nozzle with cap then continue downstream in the third path of travel to a point beneath the transfer conveyor 45 where the third path of travel and the packages 17 moving in the first path of travel are in proximity of one another with a portion of the first path being oriented such that it and a near portion of the third path lie in a common plane and at one point coincide. It is at this point of coincidence of the first and third paths that the effective assembly of the labels with nozzle and the packages is initiated.

In FIG. 10 it will be seen that the transfer conveyor 45 includes a pair of parallel push chains 207 and 209. The chain 207 carries a plurality of pairs 211 of opposing lugs 213 and 215. The chain 209 carries a plurality of pairs 217 of opposing lugs 213 and 215. The opposing lugs 213 and 215 of each pair are in line and fashioned on their upper inside edges so as to conform to the shape of the outer surface of the package 17. The pairs of lugs 211 and 217 are disposed on their respective push chains so as to be parallel to each other to form the cradles 97. The parallel chains 207 and 209 are spaced apart sufficiently to move along the outside edges of the vacuum belt 139. The pairs of lugs 211 and 217 rise above the plane of the belt 139 and are long enough to cradle the package 17 and carry it over the belt 139. In this region the belt 139 and the transfer conveyor 45 move in unison, and the relationship between the position of each cradle 97 and the labels 31 is such that the cradle 97 is centered over the space separating successive labels.

In the illustrated apparatus, the labels 31 are 5 ¾ inches long and are spaced apart one inch on the vacuum belt 19. Thus, the cradles 97 are spaced 6¾ inches apart on the transfer conveyor 45 and centered between successive labels. It will be noted that the chains 207 and 209 are carried in the chain tracks 219 and 221 respectively.

As best seen in FIG. 6, as a cradle 97 carrying a package 17 leaves the downstream end (left end as viewed in FIG. 6) of the chain tracks 219 and 221 at the point of coincidence of the respective paths of travel, the package 17 is deposited on the vacuum belt 139 intermediate successive labels and near the top plate 67. This plate may be spring loaded to apply a constant pressure on the package. Upon striking the top plate 67, the package 17 is tapered between the top plate and the moving vacuum belt 139, and the package commences to roll. Pressure is maintained on the package during the rolling by the top plate.

The package 17 is thus forced to roll under pressure in the direction indicated and onto the succeeding label 31 carrying a nozzle 23. By this time the cradle 97 has moved downwardly around a sprocket 223 at the downstream end of the transfer conveyor 45. Each label is a pressure sensitive adhesive type and the labels are disposed on the vacuum belt 139 with the adhesive layer 98 on the facing upwardly. Under the pressure of the rolling package, the label is caused to conform and become affixed to the outer surface of the wall 19 of the package 17. The upwardly facing concave surface 169 of the nozzle 23 conforms to the general shape of the wall 19, and the nozzle 23 becomes captured between the affixed label 31 and the package wall 19. It is of importance to note that the package is not punctured or otherwise opened during this assembly of the label with nozzle to the package wall. Thus, the integrity of the initially provided, completed package has been maintained and the contents of the package has not been exposed to the atmosphere or otherwise detrimentally affected. Further, the seam 29 of each package 17 is located with respect to the label 31 and nozzle 23 such that when the package wall 19 is subsequently punctured for dispensing, the puncturing does not break or otherwise open the seam. This relationship between the location of the nozzle and the seam of each dispensing package is assured by the method and apparatus of the present invention and, in brief, is a result of the repetitive interaction among uniformly sized packages 17, the uniformly positioned seams 29, and the infeed of uniformly spaced labels 31.

More specifically, the length of the label, which in the illustrated embodiment is 5¾ inches, is slightly longer than the length of the circumference of the package, resulting in an overlap of the edges of the label after the label is wrapped around and affixed to the package. It will be remembered that the seams 29 on the packages are uniformly facing the vacuum belt 139 when the packages and the vacuum belt come together below the orienter 43. Further, the seams 29 are positioned by the transfer conveyor 45 at points substantially in the middle of the spaces separating successive labels on the vacuum belt 139, these spaces being approximately one inch in the illustrated embodiment. Because the cradles 97 place the package transversely of the vacuum belt 139, the longitudinal seam 29 of the package will lie parallel to, and approximately ½ inch from, the edges of the labels in front of and behind the seam. As described above, the package 17 is caused to roll onto the immediately succeeding labels, and because the leading edge of the label is near the seam at the start of the rolling, the trailing edge of the label will also be near the seam after the completion of the rolling. This proximity of label edges and seam forces the nozzle, which is located near the center longitudinally of the label, to be located away from the seam. Thus, the final location of the seam 29 cannot be under any part of the nozzle 23 in the final wrapped condition. If the label were shorter than the length of the package circumference, the same result would be reached so long as one edge of the label is located near the seam at either the start or completion of the wrapping of the label on the package.

Since the label 31 wraps completely around and is affixed to the wall 19 of the package, the label becomes a reinforcement for the wall. Such reinforcement is desirable because of the pressures applied to the package wall during the dispensing of the contents. As mentioned previously, this dispensing occurs by an external squeezing action on the package against the contents internally to extrude the contents through an orifice 25 of the nozzle 23 after the portion of the package wall 19 immediately under the orifice 25 has been punctured to provide an opening in the package wall for the extruded of the contents. Since the wrapped package of the present invention has the nozzle located on a seam-free portion of the package wall, the seam integrity is not disturbed by the puncturing of the wall when it is desired to dispense the contents from the package.

It will be noted that the apparatus is so constructed that the portions of the first and second paths of travel (packages and nozzles respectivey) coincide with the third path (labels) in a plane common to all three paths at these portions and establish an "in line" relationship with the third path. Thus, the labels can continue to more without interruption as the nozzles are inserted and the packages are rolled onto them, which operation is advantageous in affording high speed operation.

Summarizing, there has been shown and described a method of and apparatus for making a dispensing package having a dispensing nozzle positioned on it, the dispensing package being made from a nondispensing, imperforate, collapsible wall, closed package having a longitudinal seam. The dispensing package is formed so that the nozzle is located on a seam-free portion of the package wall. The method includes providing a flexible strip having a nozzle inserted through the strip, the strip being adapted to be secured to the outer surface of the imperforate wall of the closed package to hold the nozzle between the strip and the wall and to restrain the wall against tearing during the dispensing of the contents. In this method, one edge of the strip is located parallel to and near the longitudinal seam of the nondispensing package and then the strip with the nozzle engages the outer surface of the wall of the closed package. The strip is then conformed to the shape of the closed package wall and is secured against the surface of the package wall.

The apparatus for accomplishing this method includes means for feeding a procession of the packages along a first path of travel and means for rotating the packages individually until the seam of the packages reaches a given position. The apparatus also includes means for orienting and timing a procession of nozzles along a second path of travel and means for feeding a supply of pressure adhesive label strips along a third path of travel. The third path of travel includes in succession a point of coincidence with the second path and afterward a point of coincidence with the first path. The apparatus further includes means for inserting a nozzle through an aperture of each strip at the point of coincidence with the second path and a series of cradles adapted to receive the packages with the seams in the given position for the rotating means at the point of coincidence with the first path. The cradles carry the packages transversely of the third path and move for a time in unison with the supply of labels in the third path. In doing so, the cradles locate the seams near one edge of the strips. The apparatus then includes means for rolling the packages onto the strips under pressure, the result of which is the strips are engaged with, wrapped around and affixed or secured to the walls of the closed packages.

Some advantages of the present method and apparatus are the production of dispensing packages made from completed packages filled with an extrusible product and having a longitudinal seam wherein (a) the integrity of the package is maintained, (b) the longitudinal seam of the package is uniformly positioned with respect to the label and nozzle of the dispensing package on all dispensing packages produced by the present method and apparatus so that the nozzle is located on a seam-free portion of the package wall, (c) the label is wrapped around and affixed to the package wall to both secure the position of the nozzle and reinforce the package wall, and (d) all of this is effected in a high speed and efficient manner.

Thus there has been provided in accordance with the present invention a method of and apparatus for producing a dispensing package from an existing completed, closed package having an imperforate wall wherein the dispensing nozzle is applied on a seam-free package wall and is retained in a secure position by a label that completely enwraps the package and becomes affixed thereto by the wrapping action. While the invention has been described in conjunction with a specific embodiment thereof, it is understood that many alternatives, modifications, and variations will be apparent to those skilled in the art in view of the foregoing description. Accordingly, it is intended to embrace all such alternatives, modifications, and variations that fall within the spirit and scope of the appended claims.

Various features of the present invention are set forth in the following claims.

What is claimed is:

1. A method of making dispensing packages each having a dispensing nozzle secured thereon by a strip secured to an outer collapsible wall of a longitudinally seamed package with the nozzle located on a seam-free portion of the package wall, said method comprising the steps of: continuously moving a procession of strips along a path of travel with a predetermined and uniform positioning of the strips relatively to each other, feeding a procession of dispensing packages to an orienting station, orienting the seams of each of the packages to a predetermined position at said orienting station, discharging said oriented packages and continuously forwarding said oriented packages from the orienting station while maintaining a specific orientation of said seam, bringing each of the continuously traveling packages into engagement with one of the continuously traveling strips with a predetermined relationship between an edge of the strip and the longitudinal seam of the package, and conforming and securing the strip to the shape of the outer surface of the wall of the package with the nozzle positioned against the seam free portion of the package wall as the packages move continuously forward.

2. A method in accordance with claim 1 including the step of spacing each of the continuously fed strips apart at a predetermined distance to establish uniform spaces between adjacent strips and positioning the package with its seam facing downwardly at each of the spaces and in which the step of conforming and securing said strips includes rolling the packages about their longitudinal axes.

3. A method of making dispensing packages each having a dispensing nozzle secured thereon by a strip secured to an outer collapsible wall of a longitudinally seamed package with the nozzle located on a seam-free portion of the package wall, said method comprising the steps of: continuously moving a procession of packages along a first path of travel, rotating each of said continuously moving packages about its longitudinal axis until the seam is oriented in a predetermined position, feeding a procession of nozzles along a second path of travel, continuously moving a succession of strips along a third path of travel, inserting each of the nozzles traveling along said second path into an aperture in a strip at a point of coincidence of the second and third paths of travel while both the nozzles and strips are continuously moving, bringing each of the continuously moving oriented packages into contact with one of said continuously moving strips with its seam parallel to and located at a predetermined relationship relative to an edge of a traveling strip at a point of coincidence of the first and third paths while both said packages and strips are continuously moving, and securing each of said strips with a nozzle thereon to a package such that the nozzle is spaced from the longitudinally extending package seam.

4. A method in accordance with claim 3 in which the strips travel along a path having at least a portion thereof in a predetermined plane and in which the nozzles and packages have portions of their paths coinciding with said plane of travel for the strips.

5. A method in accordance with claim 3 including the further steps of: positioning the packages between adjacent strips and rolling the packages about their longitudinal axes to engage an edge of a succeeding strip at a location adjacent the package seam during the step of securing the strips to the packages.

6. A method of attaching a reinforcing pressure sensitive adhesive label strip and a dispensing nozzle projecting therethrough to the outer surface of a flexible, imperforate wall of a closed, generally cylindrical, non-dispensing package having an imperforate, collapsible wall and a longitudinal seam so that the nozzle is disposed on a seam-free portion of the wall intermediate the ends of the package, comprising continuously feeding a series of the packages along a given first path of travel; rotating the packages individually about their longitudinal axes until the seam of each package is located in a predetermined position; continuously feeding a series of nozzles, each having a flange and a projecting outlet and oriented with the projecting outlet downwardly along a second path of travel; continuously feeding a series of label strips closely spaced apart along a third path of travel, at least a portion of which lies in a plane common to a portion of the second path and in coincidence therewith and at least another portion of which lies in a plane common to a portion of the first path and in coincidence therewith, each of said strips having an aperture therein located intermediate the ends of the strip, the aperture being adapted to receive said nozzle, and each of said strips having a pressure sensitive adhesive coating on one surface thereof, the orientation of the label strips during their travel being such that the coated surface faces upwardly; inserting the projecting outlet of said nozzle into the aperture in said strip at the point of coincidence of the second and third paths while both said nozzles and strips are continuously moving so so to engage the flange of said nozzle with the adhesive coated surface of said strip; positioning the nondispensing package with its seam facing downwardly in the space between successive strips parallel to and near the end of a strip at the point of coincidence of the first and third paths while both said packages and strips are continuously moving; and rolling the positioned nondispensing package onto the near strip and the flange of said nozzle under pressure so that the strip is bonded to the outer surface of the imperforate, collapsible wall of said package by means of the adhesive coating, thereby reinforcing the imperforate wall while holding the nozzle against the imperforate wall at a location intermediate the ends of the package and away from the seam.

7. Apparatus for making a dispensing package with a dispensing nozzle positioned thereon from a closed, nondispensing package having an imperforate, collapsible wall and a longitudinal seam so that the nozzle is located on a seam-free portion of the outer surface of the closed package, comprising means for continuously moving a procession of the packages along a first path of travel, means in the first path of travel for uniformly positioning the seams of the packages, means for moving a procession of nozzles in a predetermined orientation along a second path of travel, means for continuously moving a succession of closely spaced pressure adhesive strips having an aperture therein intermediate the ends of the strips along a third path of travel, at least a portion of which lies in a plane common to a portion of the second path and in coincidence therewith and at least another portion of which lies in a plane common to a portion of the first path and in coincidence therewith, means for inserting a nozzle in the aperture at the point of coincidence of the second and third paths of travel, means for positioning a package in the space between successive strips at the point of coincidence of the first and third paths of travel so that the seam of each package is located parallel to and near an edge of a strip with nozzle, said package positioning means continuously moving said packages in unison with said continuously moving strips, and means for rolling the package under pressure onto the strip and nozzle.

8. Apparatus in accordance with claim 7 wherein said portions of the first and second paths coinciding with said portions of the third path are aligned with the third path in a plane common to the respective portions.

9. Apparatus for attaching a reinforcing strip and a dispensing nozzle projecting therethrough to a collapsible, imperforate wall of a completed, closed, generally cylindrical package having a longitudinal seam so that the nozzle is located on a seam-free portion of the wall, comprising means for feeding a procession of the packages along a first path of travel, means for rotating each of the packages individually about its longitudinal axis until the seam reaches a predetermined position, means for orienting and moving a procession of nozzles along a second path of travel, means for feeding a supply of pressure adhesive strips having an aperture therein intermediate the ends of the strips along a third path of travel, the third path of travel including a portion lying in a plane common to a portion of said second path and in coincidence therewith and thereafter another portion lying in a plane common to a portion of said first path and in coincidence therewith, means for inserting a nozzle through the aperture of each strip at the point of coincidence of the second and third paths of travel, cradle adapted to receive one package at a time with the seam in said predetermined position from said means for rotating the packages near the point of coincidence of the first and third paths of travel, said cradle moving for a time in unison with the supply of labels in said third path and in relation to the labels so as to locate the package just above the labels and the seam of the package near one edge of a strip, and means for rolling the cylindrical package onto the strip at a point downstream of the point of coincidence of the first and third paths with the nozzles projecting outwardly from the package, whereby the strip conforms and adheres to the outer surface of the wall of each package and the nozzle is located on a portion of the wall away from the seam.

10. Apparatus in accordance with claim 9 wherein said means for rotating each of the packages individually includes a wheel comprising equally spaced apart seats around the perimeter thereof for receiving the packages, each seat having a pair of rolls for imparting rotative motion to a package about its axis, means for retaining the packages in the seats during wheel rotation, means for sensing the seam of the package and control means for stopping the rotation of the package at a position in response to the sensing of the seam wherein the seam is facing away from the center of the wheel, and means for releasing each package from its seat during wheel rotation as the package reaches the six o'clock position of the wheel whereby the seam of each package is facing downwardly at the point of release.

* * * * *

UNITED STATES PATENT AND TRADEMARK OFFICE
CERTIFICATE OF CORRECTION

PATENT NO. : 3,948,711
DATED : April 6, 1976
INVENTOR(S) : Robert J. Piatek

It is certified that error appears in the above-identified patent and that said Letters Patent are hereby corrected as shown below:

Column 1, line 63, "5a" second occurrence should be -- 5b --;

Column 3, line 40, "appliable" should be -- applicable --;

Column 3, line 65, "coneyor" should be -- conveyor --;

Column 4, line 7, "coneyor" should be -- conveyor --;

Column 11, line 56, "spced" should be -- spaced --;

Column 12, line 64, "19" should be -- 139 --;

Column 13, line 9, "tapered" should be -- trapped --;

Column 14, line 19, "extruded" should be -- extruding --;

Column 14, line 30, "more" should be -- move --;

Column 14, line 46, "this" should be -- the --;

Column 17, Claim 6, line 4, "so so to" should be -- so as to --;

Column 18, Claim 10, line 46, "wherein" should be -- where --.

Signed and Sealed this

Seventeenth Day of August 1976

[SEAL]

Attest:

RUTH C. MASON
*Attesting Officer*

C. MARSHALL DANN
*Commissioner of Patents and Trademarks*